United States Patent
Strock et al.

(10) Patent No.: US 12,351,920 B2
(45) Date of Patent: Jul. 8, 2025

(54) TURBINE ENGINE ABRADABLE SYSTEMS

(71) Applicant: Raytheon Technologies Corporation, Farmington, CT (US)

(72) Inventors: Christopher W. Strock, Kennebunk, ME (US); Kevin C Seymour, Riviera Beach, FL (US)

(73) Assignee: RTX Corporation, Farmington, CT (US)

( * ) Notice: Subject to any disclaimer, the term of this patent is extended or adjusted under 35 U.S.C. 154(b) by 653 days.

(21) Appl. No.: 17/760,936

(22) PCT Filed: Mar. 6, 2020

(86) PCT No.: PCT/US2020/021567
§ 371 (c)(1),
(2) Date: Mar. 16, 2022

(87) PCT Pub. No.: WO2021/055004
PCT Pub. Date: Mar. 25, 2021

(65) Prior Publication Data
US 2022/0333250 A1 Oct. 20, 2022

Related U.S. Application Data

(60) Provisional application No. 62/903,295, filed on Sep. 20, 2019.

(51) Int. Cl.
*C23C 28/00* (2006.01)
*C03B 35/12* (2006.01)
(Continued)

(52) U.S. Cl.
CPC .......... *C23C 28/3455* (2013.01); *C03B 35/12* (2013.01); *C04B 35/185* (2013.01);
(Continued)

(58) Field of Classification Search
CPC .......................... C23C 28/3455; C04B 35/185
See application file for complete search history.

(56) References Cited

U.S. PATENT DOCUMENTS 6,884,470 B2   4/2005   Gorman
6,887,036 B2   5/2005   Ohara et al.
(Continued)

FOREIGN PATENT DOCUMENTS

EP   0661415 A1   7/1995
EP   1865150 A1   12/2007
(Continued)

OTHER PUBLICATIONS

European Search Report dated Jul. 10, 2024 for European Patent Application No. 24172015.0.
(Continued)

*Primary Examiner* — Robert A Vetere
(74) *Attorney, Agent, or Firm* — Bachman & LaPointe, P.C.

(57) ABSTRACT

A turbine engine has: a first member (22) having a surface bearing an abradable coating, the abradable coating (36) being at least 90% by weight ceramic; and a second member (24) having a surface bearing an abrasive coating. The abrasive coating (56) has a metallic matrix (64) and a ceramic oxide abrasive (66) held by the metallic matrix, the first member and second member mounted for relative rotation with the abrasive coating facing or contacting the abradable coating. At least 50% by weight of the ceramic abrasive has a melting point at least 400K higher than a melting point of at least 20% by weight of the ceramic of the abradable coating.

20 Claims, 3 Drawing Sheets

(51) Int. Cl.
    *C04B 35/185*    (2006.01)
    *C04B 35/195*    (2006.01)
    *C04B 35/46*     (2006.01)
    *C04B 35/488*    (2006.01)
    *C04B 35/583*    (2006.01)

(52) U.S. Cl.
    CPC ............ *C04B 35/195* (2013.01); *C04B 35/46* (2013.01); *C04B 35/4885* (2013.01); *C04B 35/583* (2013.01); *C23C 28/3215* (2013.01); *C23C 28/324* (2013.01); *C23C 28/347* (2013.01)

(56) References Cited

U.S. PATENT DOCUMENTS

| | | | |
|---|---|---|---|
| 7,510,370 | B2 | 3/2009 | Strangman et al. |
| 10,060,281 | B2 | 8/2018 | Strock et al. |
| 2009/0258247 | A1 | 10/2009 | Kulkarni et al. |
| 2011/0164961 | A1 | 7/2011 | Taylor |
| 2013/0071235 | A1* | 3/2013 | Strock ................. F01D 11/122 415/174.4 |
| 2014/0147242 | A1* | 5/2014 | Ghasripoor ............. F01D 5/288 205/110 |
| 2016/0003092 | A1* | 1/2016 | Chamberlain ..... G01B 11/0616 428/323 |

FOREIGN PATENT DOCUMENTS

| WO | 2011/008719 A1 | 1/2011 |
|---|---|---|
| WO | 2021/055004 A1 | 3/2021 |

OTHER PUBLICATIONS

International Search Report and Written Opinion dated Jul. 31, 2020 for PCT/US2020/021567.

* cited by examiner

TURBINE ENGINE ABRADABLE SYSTEMS

CROSS-REFERENCE TO RELATED APPLICATION

Benefit is claimed of U.S. Patent Application No. 62/903,295, filed Sep. 20, 2019, and entitled "Turbine Engine Abradable Systems", the disclosure of which is incorporated by reference herein in its entirety as if set forth at length.

BACKGROUND

The disclosure relates to gas turbine engines. More particularly, the disclosure relates to high temperature turbine engine abradable systems.

Gas turbine engines (used in propulsion and power applications and broadly inclusive of turbojets, turboprops, turbofans, turboshafts, industrial gas turbines, and the like) use abradable seal systems in multiple locations to seal between relatively rotating components. The main situation involves the interface between blade tips and adjacent static structure. Other situations include interfaces between inner diameter (ID) vane tips and rotating structure such as a shaft. In typical systems there is an abrasive coating on one of the relatively rotating members and an abradable coating on the other.

The nature of the abradable-abrasive pair depends on location in the engine and other relevant considerations including operating temperature. One class of such pairs involves: ceramic abradable coatings; and abrasive coatings formed by ceramic abrasive particles in a metallic matrix. Such pairs may be used in relatively high temperature locations in a compressor (e.g., relatively downstream such as in the final compressor section of a multi-section compressor (e.g., high pressure compressor (HPC)). An exemplary such coating involves the abradable coating on the inner diameter (ID) surface of a blade outer airseal (BOAS) (e.g., segmented or full annulus) and the abrasive coating on tips of the airfoils of the adjacent stage of blades. Typical BOAS and blade substrate materials are nickel-based superalloys. A bondcoat (e.g., a diffusion aluminide or an air plasma sprayed (APS) or PVD MCrAlY) may intervene between the ceramic abradable coating (e.g., thermal sprayed) and BOAS substrate. The abrasive coating matrix (e.g., nickel) with abrasive (e.g., cubic boron nitride (cBN) sublimation point 3,246 K)) may be directly plated (e.g., electroplated) to the blade substrate.

SUMMARY

One aspect of the disclosure involves a turbine engine comprising: a first member having a surface bearing an abradable coating, the abradable coating being at least 90% by weight ceramic; and a second member having a surface bearing an abrasive coating. The abrasive coating comprises a metallic matrix and a ceramic oxide abrasive held by the metallic matrix. The first member and second member are mounted for relative rotation with the abrasive coating facing or contacting the abradable coating. At least 50% by weight of the ceramic abrasive has a melting point at least 400K higher than a melting point of at least 20% by weight of the ceramic of the abradable coating (and/or at least 80% by weight of the matrix of the abradable coating).

A further embodiment of any of the foregoing embodiments may additionally and/or alternatively include the ceramic oxide abrasive forming at least 5% by weight of the abrasive coating.

A further embodiment of any of the foregoing embodiments may additionally and/or alternatively include at least 90% by weight of the ceramic oxide abrasive having a melting point at least 400K higher than a melting point of at least 20% by weight of the ceramic of the abradable coating (and/or at least 80% by weight of the matrix of the abradable coating).

A further embodiment of any of the foregoing embodiments may additionally and/or alternatively include at least 90% by weight of the ceramic oxide abrasive having a melting point 400K to 1850K higher than a melting point of at least 20% by weight of the ceramic of the abradable coating (and/or at least 80% by weight of the matrix of the abradable coating).

A further embodiment of any of the foregoing embodiments may additionally and/or alternatively include at least 90% by weight of the ceramic oxide abrasive having a melting point 400K to 1850K higher than a melting point of at least 20% by weight of the ceramic of the abradable coating (and/or at least 80% by weight of the matrix of the abradable coating).

A further embodiment of any of the foregoing embodiments may additionally and/or alternatively include the abradable ceramic comprising a ceramic matrix and a ceramic filler. The ceramic filler is softer than the ceramic matrix.

A further embodiment of any of the foregoing embodiments may additionally and/or alternatively include the ceramic filler having a melting temperature or a sublimation temperature higher than a melting point of said ceramic matrix.

A further embodiment of any of the foregoing embodiments may additionally and/or alternatively include the ceramic filler having a Mohs hardness 5.0 or less.

A further embodiment of any of the foregoing embodiments may additionally and/or alternatively include the ceramic filler being selected from the group consisting of: HBN; and Magneli phase titanium oxide.

A further embodiment of any of the foregoing embodiments may additionally and/or alternatively include the metallic matrix of the abrasive coating being an MCrAlY.

A further embodiment of any of the foregoing embodiments may additionally and/or alternatively include the first member comprising a blade outer airseal substrate having an inner diameter surface and a bondcoat atop the inner diameter surface, the abradable coating atop the bondcoat.

A further embodiment of any of the foregoing embodiments may additionally and/or alternatively include: the at least 50% by weight of the ceramic oxide abrasive being selected from the group consisting of: zirconia, partially stabilized zirconia, chromia, and mixtures thereof; and/or the at least 20% by weight of the ceramic of the abradable coating (and/or at least 80% by weight of the matrix of the abradable coating) being mullite.

A further embodiment of any of the foregoing embodiments may additionally and/or alternatively include: the at least 50% by weight of the ceramic oxide abrasive being selected from the abrasives listed in Table I; and the at least 20% by weight of the ceramic of the abradable coating being selected from the abradable matrices listed in Table I but meeting the identified Table I melting point and hardness criteria.

A further embodiment of any of the foregoing embodiments may additionally and/or alternatively include: the abradable ceramic comprising a ceramic matrix and a ceramic filler; and the ceramic filler being listed in Table III as an abradable filer.

A further embodiment of any of the foregoing embodiments may additionally and/or alternatively include: the at least 50% by weight of the ceramic oxide abrasive being 7YSZ; and the at least 20% by weight of the ceramic of the abradable coating (and/or at least 80% by weight of the matrix of the abradable coating) being mullite.

A further embodiment of any of the foregoing embodiments may additionally and/or alternatively include: the at least 50% by weight of the ceramic oxide abrasive being chromium oxide; and the at least 20% by weight of the ceramic of the abradable coating (and/or at least 80% by weight of the matrix of the abradable coating) being rutile titania.

A further embodiment of any of the foregoing embodiments may additionally and/or alternatively include: the at least 50% by weight of the ceramic oxide abrasive being zirconia-toughened alumina (e.g., 2% to 20% zirconia by weight); and the at least 20% by weight of the ceramic of the abradable coating (and/or at least 80% by weight of the matrix of the abradable coating) being enstatite.

A further embodiment of any of the foregoing embodiments may additionally and/or alternatively include the at least 50% by weight of the ceramic oxide abrasive being selected from the group consisting of: partially-stabilized zirconia; zirconia-toughened alumina; and chromium oxide.

A further embodiment of any of the foregoing embodiments may additionally and/or alternatively include: the at least 50% by weight of the ceramic oxide abrasive being selected from the group consisting of: partially-stabilized zirconia; zirconia-toughened alumina; and chromium oxide; and/or the at least 50% by weight of the ceramic of the abradable coating is selected from the group consisting of: mullite; rutile titania; and enstatite.

A further embodiment of any of the foregoing embodiments may additionally and/or alternatively include a method for using the turbine engine. The method comprises: running the engine to relatively rotate the first member and the second member; and the running causing the abrasive coating to contact and cut the abradable coating.

A further embodiment of any of the foregoing embodiments may additionally and/or alternatively include, during the running, in absolute temperature, the local maximum operating temperature being at most 60% the melting point of at least 50% by weight of the ceramic of the abradable coating.

Another aspect of the disclosure involves an abradable material comprising: at least 20% by volume mullite; and at least 35% by volume Magneli phase titanium oxide.

A further embodiment of any of the foregoing embodiments may additionally and/or alternatively include the abradable material further comprising a remainder by volume being at least one of porosity, impurities, and fugitive.

A further embodiment of any of the foregoing embodiments may additionally and/or alternatively include a blade outer airseal comprising: a substrate having a concave surface; the abradable material; and a bondcoat between the abradable material and the concave surface.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Current abradable system pairs are a limiting factor for high pressure compressor (HPC) development. Further increasing compression in new engine designs involves increasing temperatures to the point of causing diffusion reaction and hot corrosion (particularly in the presence of environmental salts, most significantly such as when operating in coastal areas and/or desert areas (where dust-borne contaminants are an issue)). Sulfur compounds (e.g., sulfur dioxide, sulfates, sulfides, and the like) such as in polluted environments are also problems. In such conditions, it may be desirable to replace the baseline cBN with a more environmentally robust abrasive. Despite a high sublimation point of 3,246 K, cBN can suffer failures at lower temperatures. For example, conventional cBN abrasives operate well at temperatures in the range of 400 K to 900 K. At higher temperatures, (e.g., above 900K), oxidation starts to occur. Also, there can be reactions between the cBN and the matrix holding it (e.g., nickel or nickel alloy). At or above 1000 K, life will be very short.

Figure 1:
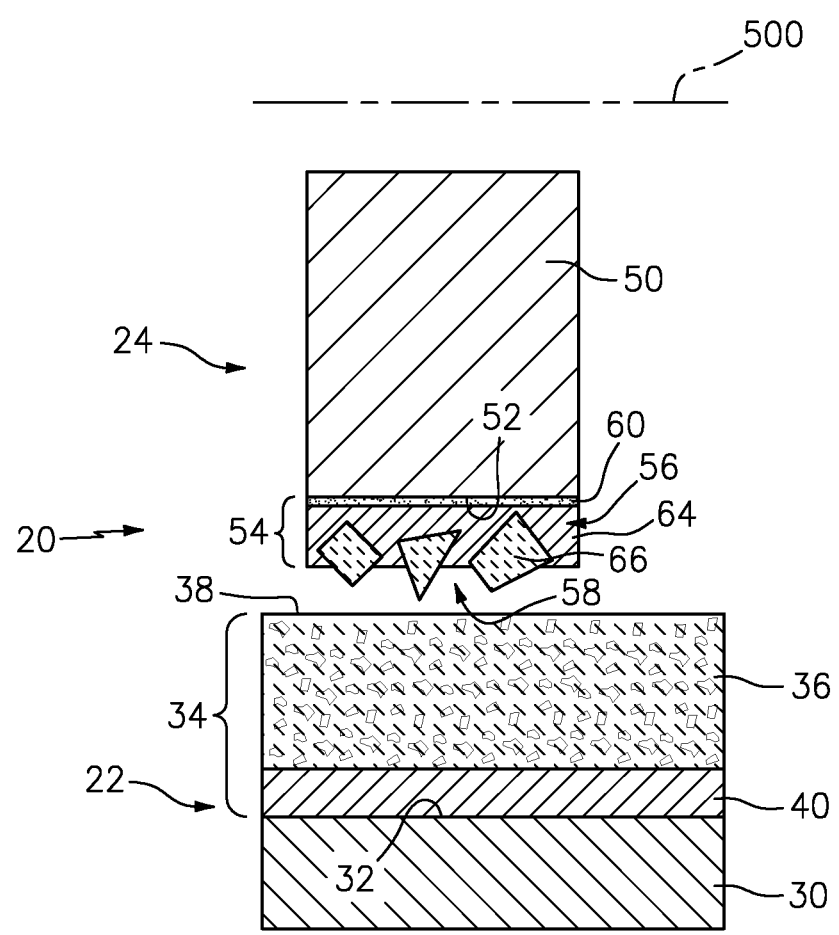
FIG. 1 is a schematic sectional view of a blade rub interaction in a gas turbine engine.

FIG. 1 shows a turbomachine 20 first member 22 as a non-rotating shroud (e.g., segmented blade outer air seal (BOAS)) and second member 24 as a rotating blade. The first member 22 comprises a substrate 30 (e.g., metallic, such as nickel-based superalloy) having a surface 32. Along a portion of the surface 32 (e.g., a BOAS segment inner diameter (ID) surface in the example), the surface 32 bears a first coating system 34. The first system 34 includes an abradable coating (coating layer) 36 having an exposed surface 38. A bondcoat 40 (e.g., thermal sprayed MCrAlY or diffusion aluminide) may intervene between abradable coating 36 and the substrate 30.

Figure 1A:
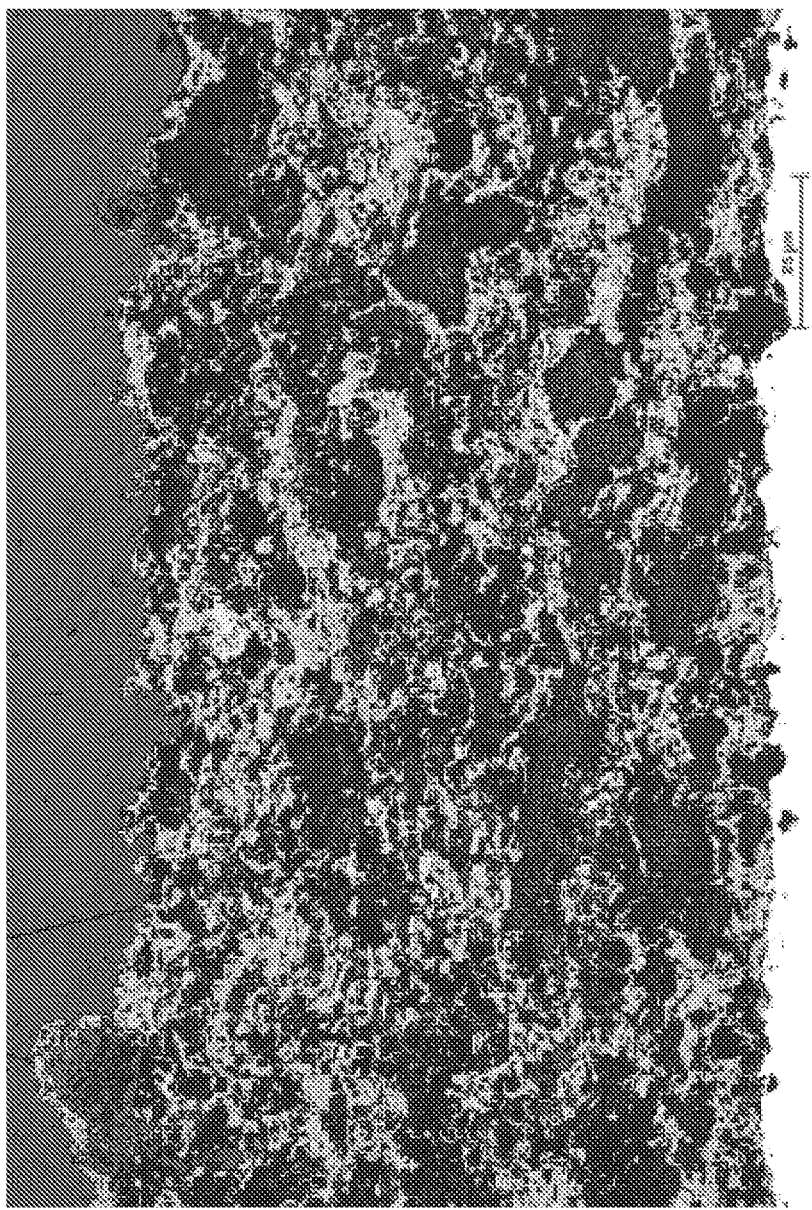
FIG. 1A is a micrograph of an abradable coating on one of two rubbing members in the interaction.
Figure 1B:
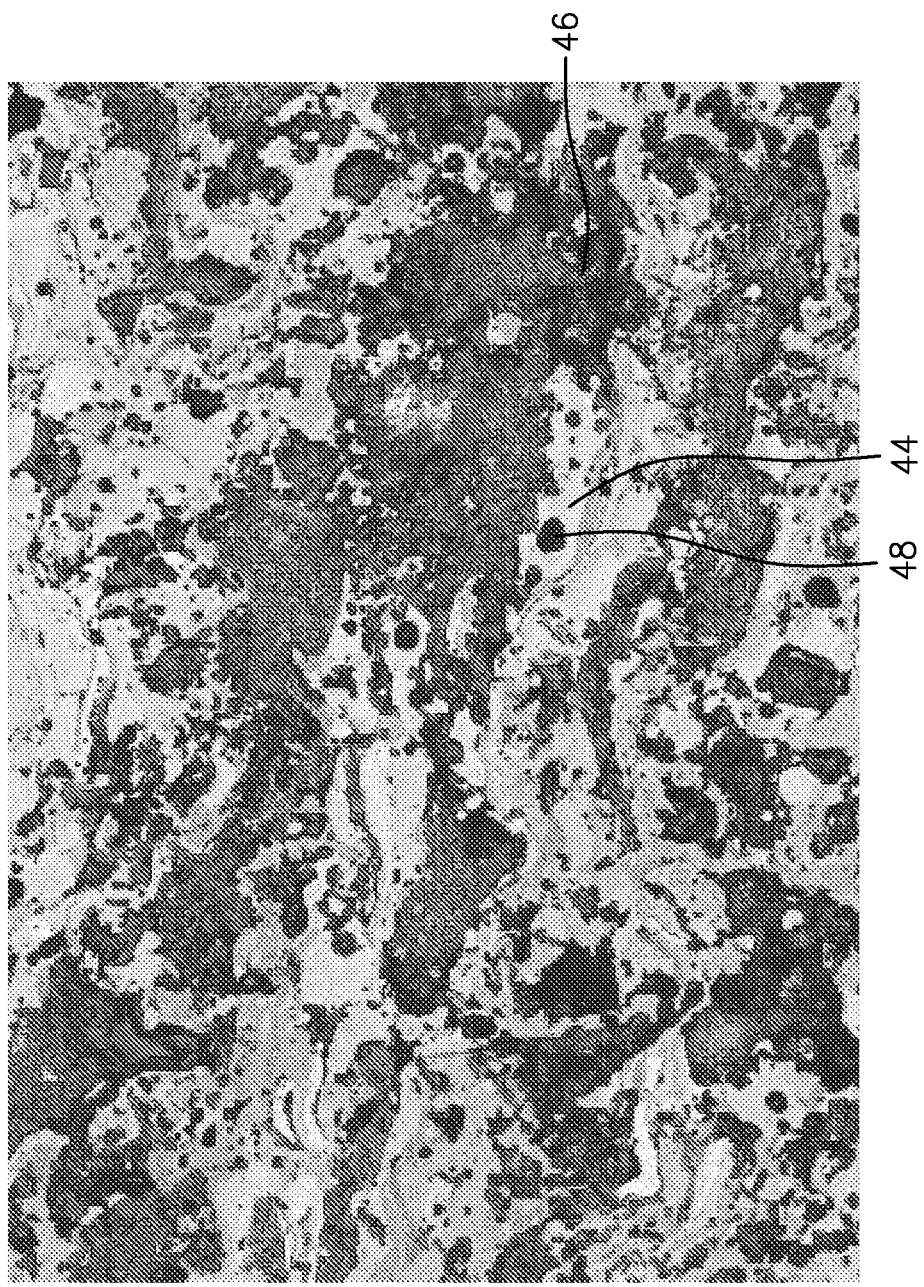
FIG. 1B is a four times further enlarged view of the micrograph of FIG. 1A.

The abradable coating 36 includes a ceramic 44 (FIG. 1A/1B) and optional filler 46 along with porosity 48. For ease of reference, the ceramic 44 will be referred to as a matrix or matrix phase even where there is no filler. In examples discussed below, the filler 46 is also ceramic (ceramic filler). The FIG. 1A/1B example is rutile titania ceramic 44 and hBN filler 46. In a thermal spray deposition of the abradable coating 36 the porosity will include a component merely due to the spray parameters and a component due to the inclusion of a fugitive powder (if any) in the spray feedstock. In use or in a pre-use heating, the fugitive is vaporized or decomposed to leave porosity. Exemplary fugitives are polymers such as polyesters and/or acrylics. Overall, the two-(or more)-component abradable may be 100% ceramic or an exemplary at least 95% or at least 90% by weight (particularly after fugitive removal). Exemplary by weight matrix content is at least 20% or at least 25% or at least 35% and may be as high as 75%.

The second member 24 comprises a substrate 50 (e.g., metallic, such as nickel-based superalloy) having a surface 52. Along a portion of the surface 52 (e.g., an airfoil tip surface in the example), the surface 52 bears a second coating system 54. The second system 54 includes an abrasive coating (coating layer) 56 having an exposed surface 58. A bondcoat 60 may intervene between abrasive coating 56 and the substrate. The presence and nature of a bondcoat 60 will be influenced by the nature and application technique of the matrix. The bondcoat may be an initial plating or strike of matrix material.

The abrasive coating 56 (FIG. 1) includes a metallic matrix 64 and a ceramic oxide abrasive 66 (replacing a baseline cBN) held by the matrix (e.g., as discrete particles within the matrix and optionally protruding at the surface 58. Exemplary by weight abrasive content is at least 5% or at least 10%. Exemplary upper limits for ranges using either of those lower limits are 60% or 50% or 40%. Broadly, the abrasive content may be effective from about 5 v % to 80 v % depending on application and method of manufacture, more narrowly 20 v % to 70 v %. The first member 22 and second member 24 are mounted for relative rotation about an axis 500 (engine centerline) with the abrasive coating facing or contacting the abradable coating.

In endeavoring to find a coating pair compatible with higher temperatures, there are competing considerations. Increasing the temperature capability of any given material potentially affects the performance of other materials. For example, it may increase the temperature-independent component of wear on other materials or it may exacerbate the temperature increase. For example, an increase in compression will thermodynamically correspondingly increase temperature at the last stage of the compressor. The increased material temperature capability may cause an increase in the operating temperature of the rub interface beyond that thermodynamic increase in local engine temperature.

We theorize that the material selections are bounded by two factors: the melting point of the abradable matrix 44 relative to the operating temperature (e.g., gas temperature measured via thermocouple); and the relative melting points of the abradable matrix 44 and abrasive particles 66.

Operating temperature should be no more than 80% (sintering occurring) of the abradable constituents' (matrix and filler) absolute melting point(s). More particularly, the operating temperature would be 75% or two thirds or less or 60% or less or 50% or less. This will reduce sintering and improve durability of the abradable coating. At 50% or less there should be essentially no sintering.

The abrasive melting point should be at least 400 Kelvin (K) greater than the abradable matrix melting point. When looking at multi-ceramic systems, this may be further defined. There may be multiple ceramic abrasives and all need not have this relation to the matrix. Similarly, in the abradable some ceramics, particularly the filler, may not have this relationship. Thus, this relationship may exist for an exemplary at least 50% by weight (or at least 75% or at least 90% or at least 95% or 100%) of the ceramic abrasive and at least 20% by weight of the ceramic of the abradable (again with a full continuum of higher levels of 25% or further 5% increments up to 100%). When looking only at ceramic matrix, this relationship may exist for an exemplary at least 50% by weight (or at least 75% or at least 90% or at least 95% or 100%) of the ceramic abrasive and at least 80% by weight of the ceramic matrix of the abradable (again with a full continuum of higher levels of 85% or further 5% increments up to 100% or at least 98%). Particular examples in the tables below highlight the relevance of these numbers.

Such melting point differences for material pairs are shown in Table I below. In addition to showing melting points, Table I also includes data reflecting the conventional requirement that the abrasive 66 is harder than the abradable matrix 44. The table shows Mohs data (nearest 0.5 Mohs) and reflects a minimum delta of 1.0 Mohs.

The abrasive will similarly be harder than the filler 46. Tables II and III show data with respective difference thresholds of 1.0 Mohs and 2.0 Mohs. In general, the filler will have a Mohs harness of less than 6.0 or less than 5.0.

These limitations provide for a stable abradable structure with time and temperature (low sintering of the abradable matrix) and effective cutting without excessive dulling of the abrasive. Relatively softer filler may be allowed to sinter (as it can still be cut) but not to melt.

The 400 K temperature margin relates to the softening induced by the flash temperature of asperity contact. The softening facilitates wear. Further refined melting temperature margin (delta) ranges between abrasive and abradable matrix may have upper limits influenced by the desired avoidance of abradable matrix sintering. Further refined ranges may have lower melting temperature margin limits of 500 K or 475 K or 450K. The larger the margin (melting temperature delta), the more desirable from a cutting perspective, however, the melting point margin is limited by the propensity to sinter as discussed above. An upper limit on margin is roughly open ended depending on materials and application environment. A general likelihood is that the margin will not be greater than 1850 K.

Given the options of additives and variations, the relative and absolute properties given above for the matrix phase 44, filler 46, their combination, and the abrasive 66 may be for 100% of such components or for at least 50% by weight, or at least 75% or at least 90% or at least 95%.

As secondary factors, the abradable coating 36 may be limited to 800 psi to 3000 psi (5.5 MPa to 20.7 MPa), more narrowly 1000 psi to 2000 psi (6.9 MPa to 13.8 MPa), cohesive strength to help facilitate good cutting response at high interaction rate. Cohesive strength may be measured by ASTM C633-13(2017), Standard Test Method for Adhesion or Cohesion Strength of Thermal Spray Coatings, ASTM International, West Conshohocken, Pennsylvania Higher strength is associated with higher erosion resistance. However, higher strength is associated with damage to blades (or other rubbing parts) in a high interaction rate event, thus imposing an upper end on the desirable range. Also, abrasive matrix material, abradable coating porosity, and abradable coating soft filler content may come into play. Specifically, soft filler 46 may be incorporated into the abradable structure in a manner that reduces bonding between matrix particles in order to improve abradability while porosity and fugitive porosity formers may be used to enhance removal of matrix particles during rub interactions (for example by leaving space for particle deflection which leads to fracture wear mechanisms).

The abradable coating 36 will typically have between 20% and 50% of the matrix phase 44, by volume, depending on the material combinations, if any. The more structural contribution provided by the filler 46 (if present), the less matrix is required. There may be relevant relative properties of the matrix 44 and filler 46. For example, For example, an abradable coating 36 of mullite matrix 44 filled with Magneli phase titanium oxide filler 46 (e.g., Ex. 1 in Table IV below) may have an example composition of 25 v % mullite, 50 v % Magneli phase, 15% porosity formed from fugitive (e.g., polyester), and 10% inherent porosity from the deposition. An abradable coating made from rutile titania and incorporating only porosity (e.g., Ex. 2 in Table IV) to enhance abradability may be composed of 45 v % titania, 10% inherent porosity and 45% porosity formed from fugitive (e.g., acrylic fugitive).

Bond coat composition is somewhat arbitrary when chosen from the MCrAlY group where M is Ni, Co or combinations thereof. An example composition is Ni 22Co 17Cr 12Al 0.5Hf 0.5Y 0.4Si (commercially available as Amdry™

386-2 by Oerlikon Metco of Pfäffikon Switzerland). The bond coat may be the limiting factor for max use temperature (measured at bond coat outer surface) in the vicinity of 1850° F. or 2150° F. (1283K or 1450K) when deposited by APS or HVOF respectively with the HVOF version being heat treated for 2 hrs at 1975° F. (1352K) in vacuum and the APS not heat treated. Alternative application techniques include HVAF and wire spray methods. For non-MCrAlY bondcoats, (NiCr, NiCrAl, and the like) similar spray techniques may be used.

The abrasive tip in an example is made by capturing the abrasive 66 in a matrix 64 of nickel- or cobalt-based alloy (e.g., plating such as electroplating; spray such as APS, HVAF, HVOF, and cold spray; and additive manufacturing processes such as laser fusing, brazing, and the like). The plating may contain alloying elements as either embedded particles, plating layers or may be co-deposited. An example composition is Ni22Cr6Al. More broadly, the abrasive matrix may also include MCrAlY as discussed for the bond coat for the abradable.

TABLE I

Melting Temperature Difference between Abrasive and Abradable Matrix

| | | | | Abrasive | | | |
|---|---|---|---|---|---|---|---|
| | | | | $Al_2O_3$ | $Cr_2O_3$ | $ZrO_2$ | $HfO_2$ |
| | Max Use | | | | Mohs Hardness | | |
| | Temp | Mohs | $T_{melt}$ (K), | 9 | 8 | 8.5 | 6.5 |
| Abradable Matrix Example | (K) | Hardness | Delta | 2323 | 2708 | 2950 | 3173 |
| $Al_2O_3$ or zirconia-toughened $Al_2O_3$ | 1549 | 9.0 | 2323 | 0* | 385* | 627* | 850* |
| $ZrO_2$, with and without stabilization | 1967 | 8.5 | 2950 | −627* | −242* | 0* | 223* |
| $HfO_2$ | 2115 | 6.5 | 3173 | −850* | −465* | −223* | 0* |
| $TiO_2$ (rutile) | 1427 | 6.5 | 2140 | 183* | 568 | 810 | 1033** |
| $La_2Zr_2O_7$ (pyrochlore) | 1715 | 5.5 | 2573 | −250* | 135* | 377* | 600 |
| $FeTiO_3$ (ilmenite) | 882 | 5.5 | 1323 | 1000 | 1385 | 1627 | 1850 |
| $3Al_2O_3$—$2SiO_2$ (mullite) | 1409 | 7.0 | 2113 | 210* | 595 | 837 | 1060** |
| $Fe_2SiO_4$ (fayalite) | 1642 | 7.0 | 2463 | −140* | 245* | 487 | 710** |
| $CaSiO_3$ (wollastonite) | 1209 | 5.0 | 1813 | 510 | 895 | 1137 | 1360 |
| $CaTiOSiO_4$ (titanite) | 1105 | 5.5 | 1657 | 666 | 1051 | 1293 | 1516 |
| $Na_3K(Al_4Si_4O_{16})$ (nepheline) | 862 | 6.0 | 1293 | 1030 | 1415 | 1657 | 1880** |
| $MgSiO_3$ (enstatite) | 1220 | 5.5 | 1830 | 493 | 878 | 1120 | 1343 |

*Fails $T_m$ criterion
**Meets $T_m$ but fails hardness criterion
Hardness criterion: Abradable matrix hardness 1 mohs point or more lower than matrix
Temperature criterion: Melting temperature of abradable matrix 400 C. or more lower than abrasive

TABLE II

Mohs Hardness, Delta Between Abradable Coating Filler and Matrix (One Point Threshold)

| | | | Abradable Filler | | | | | |
|---|---|---|---|---|---|---|---|---|
| | | | hBN | $CaF_2$ (fluorite) | $YPO_4$ (xenotime) | $Ca_5(PO_4)_3(OH)$ (apatite) | $Cu_2O$ (cuprite) | $Ti_xO_{2x−1}$, where x is 4-9 (Magneli phases) |
| | | | | | | Max Use Temp (K) | | |
| | | | 2164 | 1127 | 1512 | 1289 | 1003 | 1427 |
| | | Mohs | | | | $T_{melt}$ (K) | | |
| | | Hardness, | 3246 | 1690 | 2268 | 1933 | 1505 | 2140 |
| Abradable Matrix Example | $T_{melt}$ (K) | delta | 2.0 | 4.0 | 4.5 | 5.0 | 3.75 | 3.0 |
| $Al_2O_3$ or zirconia toughened $Al_2O_3$ | 2323 | 9.0 | −7.0 | −5.0 | −4.5 | −4.0 | −5.25 | −6.0 |
| $ZrO_2$, with and without stabilization | 2950 | 8.5 | −6.5 | −4.5 | −4.0 | −3.5 | −4.75 | −5.5 |
| $HfO_2$ | 3173 | 6.5 | −4.5 | −2.5 | −2 | −1.5 | −2.75 | −3.5 |
| $TiO_2$ (rutile) | 2140 | 6.5 | −4.5 | −2.5 | −2 | −1.5 | −2.75 | −3.5 |
| $La_2Zr_2O_7$ (pyrochlore) | 2573 | 5.5 | −3.5 | −1.5 | −1.0 | −0.5* | −1.75 | −2.5 |
| $FeTiO_3$ (ilmenite) | 1323 | 5.5 | −3.5 | −1.5 | −1.0 | −0.5* | −1.75 | −2.5 |
| $3Al_2O_3$—$2SiO_2$ (mullite) | 2113 | 7.0 | −5.0 | −3.0 | −2.5 | −2.0 | −3.25 | −4.0 |
| $Fe_2SiO_4$ (fayalite) | 2463 | 7.0 | −5.0 | −3.0 | −2.5 | −2.0 | −3.25 | −4.0 |
| $CaSiO_3$ (wollastonite) | 1813 | 5.0 | −3.0 | −1.0 | −0.5* | 0.0* | −1.25 | −2.0 |

TABLE II-continued

Mohs Hardness, Delta Between Abradable Coating Filler and Matrix (One Point Threshold)

| | | | Abradable Filler | | | | | |
|---|---|---|---|---|---|---|---|---|
| | | | hBN | CaF$_2$ (fluorite) | YPO$_4$ (xenotime) | Ca$_5$(PO$_4$)$_3$(OH) (apatite) | Cu$_2$O (cuprite) | Ti$_x$O$_{2x-1}$, where x is 4-9 (Magneli phases) |
| | | | Max Use Temp (K) | | | | | |
| | | | 2164 | 1127 | 1512 | 1289 | 1003 | 1427 |
| | | Mohs | T$_{melt}$ (K) | | | | | |
| Abradable Matrix Example | T$_{melt}$ (K) | Hardness, delta | 3246 2.0 | 1690 4.0 | 2268 4.5 | 1933 5.0 | 1505 3.75 | 2140 3.0 |
| CaTiOSiO$_4$ (titanite) | 1657 | 5.5 | −3.5 | −1.5 | −1.0 | −0.5* | −1.75 | −2.5 |
| Na$_3$K(Al$_4$Si$_4$O$_{16}$) (nepheline) | 1293 | 6.0 | −4.0 | −2.0 | −1.5 | −1.0 | −2.25 | −3.0 |
| MgSiO$_3$ (enstatite) | 1830 | 5.5 | −3.5 | −1.5 | −1.0 | −0.5* | −1.75 | −2.5 |

*Fails criterion  
Hardness criterion: Filler hardness 1 Mohs point or more lower than matrix  
Max use temperature = 0.667 × T$_{melt}$

TABLE III

Mohs Hardness, Delta Between Abradable Coating Filler and Matrix (Two Point Threshold)

| | | | Abradable Filler | | | | | |
|---|---|---|---|---|---|---|---|---|
| | | | hBN | CaF$_2$ (fluorite) | YPO$_4$ (xenotime) | Ca$_5$(PO$_4$)$_3$(OH) (apatite) | Cu$_2$O (cuprite) | Ti$_x$O$_{2x-1}$, where x is 4-9 (Magneli phases) |
| | | | Max Use Temp (K) | | | | | |
| | | | 2164 | 1127 | 1512 | 1289 | 1003 | 1427 |
| | | Mohs | T$_{melt}$ (K) | | | | | |
| Abradable Matrix Example | T$_{melt}$ (K) | Hardness, Delta | 3246 2.0 | 1690 4.0 | 2268 4.5 | 1933 5.0 | 1505 3.75 | 2140 3.0 |
| Al$_2$O$_3$ or zirconia-toughened Al$_2$O$_3$ | 2323 | 9.0 | −7.0 | −5.0 | −4.5 | −4.0 | −5.25 | −6.0 |
| ZrO$_2$, with and without stabilization | 2950 | 8.5 | −6.5 | −4.5 | −4.0 | −3.5 | −4.75 | −5.5 |
| HfO$_2$ | 3173 | 6.5 | −4.5 | −2.5 | −2.0 | −1.5* | −2.75 | −3.5 |
| TiO$_2$ (rutile) | 2140 | 6.5 | −4.5 | −2.5 | −2.0 | −1.5* | −2.75 | −3.5 |
| La$_2$Zr$_2$O$_7$ (pyrochlore) | 2573 | 5.5 | −3.5 | −1.5* | −1.0* | −0.5* | −1.75* | −2.5 |
| FeTiO$_3$ (ilmenite) | 1323 | 5.5 | −3.5 | −1.5 | −1.0* | −0.5* | −1.75* | −2.5 |
| 3Al$_2$O$_3$—2SiO$_2$ (mullite) | 2113 | 7.0 | −5.0 | −3.0 | −2.5 | −2.0 | −3.25 | −4.0 |
| Fe$_2$SiO$_4$ (fayalite) | 2463 | 7.0 | −5.0 | −3.0 | −2.5 | −2.0 | −3.25 | −4.0 |
| CaSiO$_3$ (wollastonite) | 1813 | 5.0 | −3.0 | −1.0* | −0.5* | 0.0* | −1.25* | −2.0 |
| CaTiOSiO$_4$ (titanite) | 1657 | 5.5 | −3.5 | −1.5* | −1.0* | −0.5* | −1.75 | −2.5 |
| Na$_3$K(Al$_4$Si$_4$O$_{16}$) (nepheline) | 1293 | 6.0 | −4.0 | −2.0 | −1.5* | −1.0* | −2.25 | −3.0 |
| MgSiO$_3$ (enstatite) | 1830 | 5.5 | −3.5 | −1.5* | −1.0* | −0.5* | −1.75* | −2.5 |

*Fails criterion  
Hardness criterion: Filler hardness 2 Mohs point or more lower than matrix  
Max use temperature = 0.667 × T$_{melt}$

TABLE IV

Exemplary Pairs

| | Abrasive coating volume percentages | | Abradable coating volume percentages | |
|---|---|---|---|---|
| | Matrix | Abrasive | Matrix | Filler |
| Ex. 1 | Ni22Cr6Al 70 | partially stabilized zirconia (7YSZ) 30 | mullite 25 | Magneli phase titanium oxide 50 |
| Ex. 2 | Ni22Cr6Al 80 | chromium oxide 20 | rutile titania 45 | none |
| Ex. 3 | Ni22Cr6Al 65 | zirconia-toughened alumina (4 wt % zirconia) 35 | enstatite 32 | hBN 55 |

TABLE IV-continued

| | Exemplary Pairs | | | |
|---|---|---|---|---|
| | Abrasive coating volume percentages | | Abradable coating volume percentages | |
| | Matrix | Abrasive | Matrix | Filler |
| Ex. 4 | Ni22Cr6Al 80 | zirconia (unstabilized, e.g., commercially pure) | rutile titania 35 | hBN 55 |

In the examples above, the abrasive is fully dense. The abradable remainder in Table IV is porosity or fugitive porosity formers (to be volatilized or burned out in use).

Other situations in which the abradable material may be used include interfacing with knife edge seals. One area of such examples include knife edges on a shrouded blade. Another is knife edges on an ID platform of a vane interfacing with an abradable on a rotor spacer outer diameter.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A turbine engine comprising:
a first member having a surface bearing an abradable coating, the abradable coating being at least 90% by weight ceramic; and
a second member having a surface bearing an abrasive coating, the abrasive coating comprising a metallic matrix and an ceramic oxide abrasive held by the metallic matrix,
the first member and second member mounted for relative rotation with the abrasive coating facing or contacting the abradable coating,
wherein:
at least 50% by weight of the ceramic oxide abrasive has a melting point at least 400K higher than a melting point of at least 20% by weight of the ceramic of the abradable coating;
the at least 50% by weight of the ceramic oxide abrasive is chromium oxide; and
the at least 20% by weight of the ceramic of the abradable coating is rutile titania.

2. The turbine engine of claim 1 wherein:
the abradable coating has cohesive strength 800 psi to 3000 psi (5.5 MPa to 20.7 MPa).

3. The turbine engine of claim 1 wherein:
the ceramic oxide abrasive forms at least 5% by weight of the abrasive coating.

4. The turbine engine of claim 1 wherein:
at least 90% by weight of the ceramic oxide abrasive has a melting point at least 400K higher than a melting point of at least 20% by weight of the ceramic of the abradable coating.

5. The turbine engine of claim 1 wherein:
at least 90% by weight of the ceramic oxide abrasive has a melting point 400K to 1850K higher than a melting point of at least 20% by weight of the ceramic of the abradable coating.

6. The turbine engine of claim 1 wherein:
the abradable ceramic comprises a ceramic matrix and a ceramic filler; and
the ceramic filler is softer than the ceramic matrix.

7. The turbine engine of claim 6 wherein:
at least 50% by weight of the ceramic oxide abrasive has a melting point at least 400K higher than a melting point of at least 20% by weight of the ceramic of the abradable coating.

8. The turbine engine of claim 6 wherein:
the ceramic filler has a melting temperature or a sublimation temperature higher than a melting point of said ceramic matrix.

9. The turbine engine of claim 6 wherein:
the ceramic filler has a Mohs hardness 5.0 or less.

10. The turbine engine of claim 6 wherein:
the ceramic filler is selected from the group consisting of: HBN; and Magneli phase titanium oxide.

11. The turbine engine of claim 1 wherein:
the metallic matrix is an MCrAlY.

12. The turbine engine of claim 1 wherein:
the first member comprises a blade outer airseal substrate having an inner diameter surface and a bondcoat atop the inner diameter surface, the abradable coating atop the bondcoat.

13. A method for using the turbine engine of claim 1, the method comprising:
running the engine to relatively rotate the first member and the second member; and
the running causing the abrasive coating to contact and cut the abradable coating.

14. The method of claim 13 wherein:
during the running, in absolute temperature, the local maximum operating temperature is at most 60% the melting point of at least 50% by weight of the ceramic of the abradable coating.

15. A turbine engine comprising:
a first member having a surface bearing an abradable coating, the abradable coating being at least 90% by weight ceramic; and
a second member having a surface bearing an abrasive coating, the abrasive coating comprising a metallic matrix and an ceramic oxide abrasive held by the metallic matrix, the first member and second member mounted for relative rotation with the abrasive coating facing or contacting the abradable coating, wherein:
- at least 50% by weight of the ceramic oxide abrasive has a melting point at least 400K higher than a melting point of at least 20% by weight of the ceramic of the abradable coating;
- the at least 50% by weight of the ceramic oxide abrasive is zirconia-toughened alumina; and
- the at least 20% by weight of the ceramic of the abradable coating is enstatite.

16. The turbine engine of claim 15 wherein:
the metallic matrix is an MCrAlY.

17. The turbine engine of claim 15 wherein:
the first member comprises a blade outer airseal substrate having an inner diameter surface and a bondcoat atop the inner diameter surface, the abradable coating atop the bondcoat.

18. A method for using the turbine engine of claim 15 the method comprising:
- running the engine to relatively rotate the first member and the second member; and
- the running causing the abrasive coating to contact and cut the abradable coating.

19. The method of claim 18 wherein:

during the running, in absolute temperature, the local maximum operating temperature is at most 60% the melting point of at least 50% by weight of the ceramic of the abradable coating.

20. The turbine engine of claim 15 wherein:

the ceramic oxide abrasive forms at least 5% by weight of the abrasive coating.

* * * * *